(12) United States Patent
Nagase et al.

(10) Patent No.: US 12,393,090 B2
(45) Date of Patent: Aug. 19, 2025

(54) OPTICAL DEVICE

(71) Applicant: TDK CORPORATION, Tokyo (JP)

(72) Inventors: Kenji Nagase, Hong Kong (CN);
Hiroshi Take, Hong Kong (CN);
Anthony Reymund Melad Binarao,
Hong Kong (CN); Cheng Bu Heng,
Hong Kong (CN)

(73) Assignee: TDK CORPORATION, Tokyo (JP)

( * ) Notice: Subject to any disclaimer, the term of this patent is extended or adjusted under 35 U.S.C. 154(b) by 193 days.

(21) Appl. No.: 18/190,252

(22) Filed: Mar. 27, 2023

(65) Prior Publication Data

US 2023/0314852 A1 Oct. 5, 2023

(30) Foreign Application Priority Data

Mar. 31, 2022 (CN) .......................... 202210330416.4

(51) Int. Cl.
*G02F 1/21* (2006.01)
*G02F 1/03* (2006.01)
(Continued)

(52) U.S. Cl.
CPC ............... *G02F 1/212* (2021.01); *G02F 1/03* (2013.01); *G02F 1/0316* (2013.01); *G02F 1/035* (2013.01);
(Continued)

(58) Field of Classification Search
CPC .................. G02B 6/0093; G02B 6/125; G02B 2006/1204; G02B 2006/12142;
(Continued)

(56) References Cited

U.S. PATENT DOCUMENTS

| | | | | |
|---|---|---|---|---|
| 5,612,086 A | * | 3/1997 | Hakogi | ................. G02B 6/122 |
| | | | | 427/163.2 |
| 6,377,717 B1 | * | 4/2002 | Kimber | ................. G02F 1/225 |
| | | | | 385/2 |

(Continued)

FOREIGN PATENT DOCUMENTS

| | | |
|---|---|---|
| JP | 2005-221874 A | 8/2005 |
| JP | 2006-195383 A | 7/2006 |

OTHER PUBLICATIONS

V. Dobrusin et al., "Fabrication method of low-loss large single mode ridge Ti:LiNbO3 waveguides," Opt. Mat. 29(12), 1630-1634 (2007), 5 pages. (Year: 2007).*

(Continued)

*Primary Examiner* — Uyen Chau N Le
*Assistant Examiner* — Emma R. Oxford
(74) *Attorney, Agent, or Firm* — Oliff PLC

(57) ABSTRACT

An optical device, including a substrate; an optical waveguide provided in a predetermined region of the substrate and formed of an electro-optic material film; a protective layer formed adjacent to the optical waveguide; and a non-light-propagation optical waveguide provided outside the predetermined region, wherein the surface roughness of the non-light-propagation optical waveguide is RMS 0.5 nm or more. According to the optical device, the occurrence of micro-cracks on the optical waveguide can be suppressed, thereby reducing the light propagation loss.

14 Claims, 4 Drawing Sheets

(51) Int. Cl.
G02F 1/035 (2006.01)
G02F 1/225 (2006.01)

(52) U.S. Cl.
CPC .......... G02F 1/225 (2013.01); *G02F 2201/07* (2013.01); *G02F 2202/20* (2013.01)

(58) Field of Classification Search
CPC . G02F 1/011; G02F 1/025; G02F 1/03; G02F 1/0305; G02F 1/0316; G02F 1/035; G02F 1/0356; G02F 1/21; G02F 1/212; G02F 1/225; G02F 1/2255; G02F 2201/07; G02F 2202/20
See application file for complete search history.

(56) References Cited

U.S. PATENT DOCUMENTS

| 6,952,514 | B2* | 10/2005 | Lee | G02B 6/12007 385/52 |
| 7,526,151 | B1* | 4/2009 | Little | G03F 7/0005 385/39 |
| 8,380,023 | B2* | 2/2013 | Matsubara | G02B 6/125 385/9 |
| 11,947,147 | B2* | 4/2024 | Nagase | G02F 1/035 |
| 12,271,094 | B2* | 4/2025 | Take | G02F 1/212 |
| 2002/0159690 | A1* | 10/2002 | Lupu | G02B 6/12007 385/24 |
| 2005/0175271 | A1 | 8/2005 | Sugiyama et al. | |
| 2008/0279497 | A1* | 11/2008 | Liu | G02B 6/1203 385/4 |
| 2009/0324165 | A1* | 12/2009 | Sugiyama | G02B 6/1342 264/1.24 |
| 2020/0218126 | A1* | 7/2020 | Iwatsuka | G02F 1/225 |
| 2023/0112785 | A1* | 4/2023 | Nagase | G02F 1/212 385/2 |

OTHER PUBLICATIONS

N. Courjal et al., "High aspect ratio lithium niobate ridge waveguides fabricated by optical grade dicing," J. Phys. D: Appl. Phys. 44(30), 305101 (2011), 7 pages. (Year: 2011).*

* cited by examiner

OPTICAL DEVICE

FIELD OF THE INVENTION

The present invention relates to an optical device used in the fields of optical communication and optical measurement.

BACKGROUND OF THE INVENTION

Communication traffic has been remarkably increased with widespread Internet use, and optical fiber communication is becoming significantly important. The optical fiber communication is a technology that converts an electric signal into an optical signal and transmits the optical signal through an optical fiber and has the characteristics of wide bandwidth, low loss, and resistance to noise.

As a method for converting an electric signal into an optical signal, a direct modulation method using a semiconductor laser and an external modulation method using an optical modulator are known. The direct modulation method does not require the optical modulator and is low in cost, but there are limits to high-speed modulation. On the other hand, the external modulation method is used for high-speed and long-distance applications.

As the optical modulator, a Mach-Zehnder optical modulator in which an optical waveguide is formed by Ti (titanium) diffusion in the vicinity of the surface of a single-crystal lithium niobate substrate has been practically used (see, Patent Document 1). The Mach-Zehnder optical modulator is an optical modulator that uses an optical waveguide (Mach-Zehnder optical waveguide) having a Mach-Zehnder interferometer structure. The Mach-Zehnder interferometer is a device that separates light emitted from one light source into two beams, makes the two beams pass through different paths, and then recombines the two beams to cause interference, and the Mach-Zehnder optical modulator applying the Mach-Zehnder interferometer is used for generating various modulated lights. Although high-speed optical modulators having a modulation speed of 40 Gb/s or more are commercially available, they have a major drawback that the entire length thereof is as long as about 10 cm.

In contrast, Patent Document 2 discloses a Mach-Zehnder optical modulator using a lithium niobate film. The optical modulator using the lithium niobate film (LN film) achieves significant reduction in size and has a lower driving voltage than an optical modulator using a lithium niobate single-crystal substrate. In Patent Document 2, by the step of forming the LN film at the substrate and the step of etching the LN thin film and forming the optical waveguide at the substrate, sufficient light confinement effect is obtained so that the operation speed of the electro-optic device is speed up.

In the optical waveguide using the LN film, it is important to confine the entry of light so as to reduce the driving voltage. Thus, the LN film quality and the adhesion with the protective layer must be emphasized to avoid micro-cracks on the LN film.

For example, silicon oxide with a low refractive index as the protective layer is formed adjacent to the LN film as the optical waveguide. Thereby, the influence of stress caused by the different coefficients of expansion between the LN film and the material constituting the protective layer may cause the light propagation loss.

CITATION LIST

Patent Document

Patent Document 1: JP 2005-221874A
Patent Document 2: JP 2006-195383A

SUMMARY OF THE INVENTION

The present invention is completed in view of the above problems, and its object is to provide an optical device with a small light propagation loss.

The optical device of an embodiment of the present invention comprises: a substrate; an optical waveguide provided in a predetermined region of the substrate and formed of an electro-optic material film; a protective layer formed adjacent to the optical waveguide; and a non-light-propagation optical waveguide provided outside the predetermined region, and the surface roughness of the non-light-propagation optical waveguide is RMS 0.5 nm or more.

According to the optical device of the present invention, by providing the non-light-propagation optical waveguide, the stress applied to the optical waveguide film from the protective film can be decreased, and the occurrence of the micro-cracks on the optical waveguide can be suppressed, thereby reducing the light propagation loss. Furthermore, by roughening the non-light-propagation optical waveguide, the influence of stress caused by the different coefficients of expansion between lithium niobate and silicon oxide is reduced, and the occurrence of micro-cracks on the optical waveguide is further suppressed, thereby reducing the light propagation loss.

In addition, in the optical device of the present invention, preferably, when viewing the substrate from above, a long side direction of the non-light-propagation optical waveguide extends along the predetermined direction.

In addition, in the optical device of the present invention, preferably, the optical waveguide comprises a straight line portion, when viewing the substrate from above, one side of the non-light-propagation optical waveguide extends along the straight line portion of the optical waveguide.

In addition, in the optical device of the present invention, preferably, when viewing the substrate from above, the shape of the non-light-propagation optical waveguide is a rectangular shape, and one side on its long side extends along the straight line portion of the optical waveguide.

In addition, in the optical device of the present invention, preferably, the non-light-propagation optical waveguide is provided in the vicinity of the straight line portion of the optical waveguide.

In addition, in the optical device of the present invention, preferably, when viewing from the direction crossing the substrate, the shape of the surface roughness of the non-light-propagation optical waveguide is a longitudinal stripe shape.

In addition, in the optical device of the present invention, preferably, the surface roughness of the non-light-propagation optical waveguide is RMS 1.0 nm or more.

In addition, in the optical device of the present invention, preferably, a plurality of the non-light-propagation optical waveguides are provided.

In addition, in the optical device of the present invention, preferably, the film thicknesses of the non-light-propagation optical waveguide and the optical waveguide are substantially the same.

In addition, in the optical device of the present invention, preferably, the electro-optic material film is a film formed of $LiNbO_3$.

In addition, in the optical device of the present invention, preferably, the electro-optic material film is a film formed of $LiNbO_3$ doped with at least Ti.

In addition, in the optical device of the present invention, preferably, the electro-optic material film is an epitaxial film.

In addition, in the optical device of the present invention, preferably, the epitaxial film is orientated in a direction crossing the substrate.

The optical modulator of another embodiment of the present invention comprises: a substrate; an optical waveguide provided in the predetermined region of the substrate and formed of an electro-optic material film; a protective layer formed adjacent to the optical waveguide; an electrode applying an electric field to the optical waveguide; and a non-light-propagation optical waveguide provided outside the predetermined region, and the surface roughness of the non-light-propagation optical waveguide is RMS 0.5 nm or more.

Advantageous Effects of the Invention

According to the optical device and the optical modulator with the optical device of the present invention, the light propagation loss can be reduced effectively.

BRIEF DESCRIPTION OF THE DRAWINGS

FIG. 1(b) illustrates the entire configuration of the optical modulator 100 including the optical device illustrated in FIG. 1(a) and traveling wave electrodes.

FIG. 3(a) and FIG. 3(b) are views illustrating the optical modulator 200 with the optical device of the second embodiment of the present invention, in which FIG. 3(a) is the top view only illustrating the optical waveguide of the optical modulator 200, and FIG. 3(b) is an illustrative cross-sectional view of the optical modulator 200 taken along line A-A' of FIG. 3(a).

FIG. 4(a) and FIG. 4(b) are views illustrating the optical modulator 300 with the optical device of the third embodiment of the present invention, in which FIG. 4(a) is the top view only illustrating the optical waveguide of the optical modulator 300, and FIG. 4(b) is an illustrative cross-sectional view of the optical modulator 300 taken along line A-A' of FIG. 4(a).

DETAILED DESCRIPTION

Hereinafter, embodiments of the present invention will be described in detail with reference to the accompanying drawings.

Figure 1A:
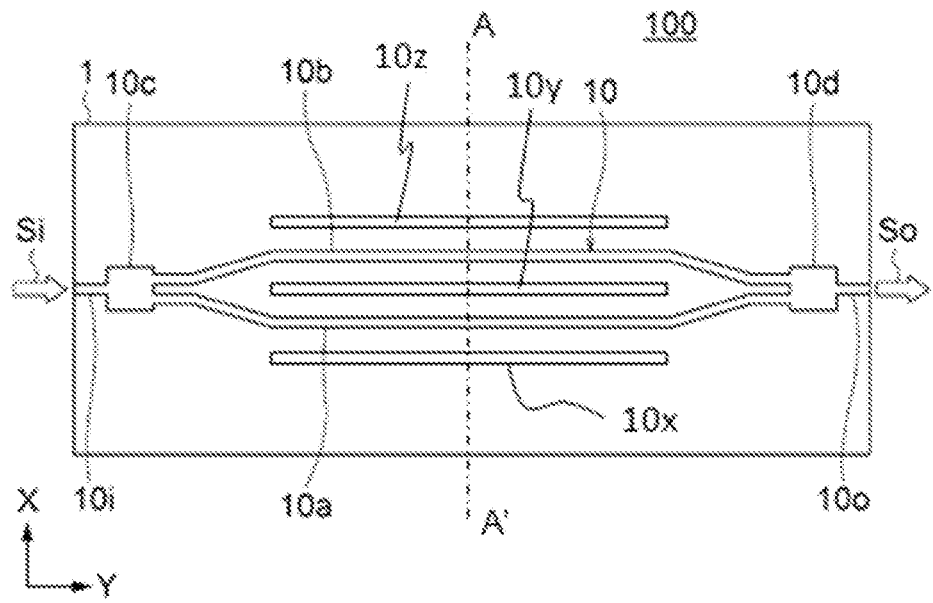
FIG. 1(a) and FIG. 1(b) are top views illustrating the optical modulator 100 with the optical device of the first embodiment of the present invention, in which FIG. 1(a) only illustrates the optical waveguide.
Figure 1B:
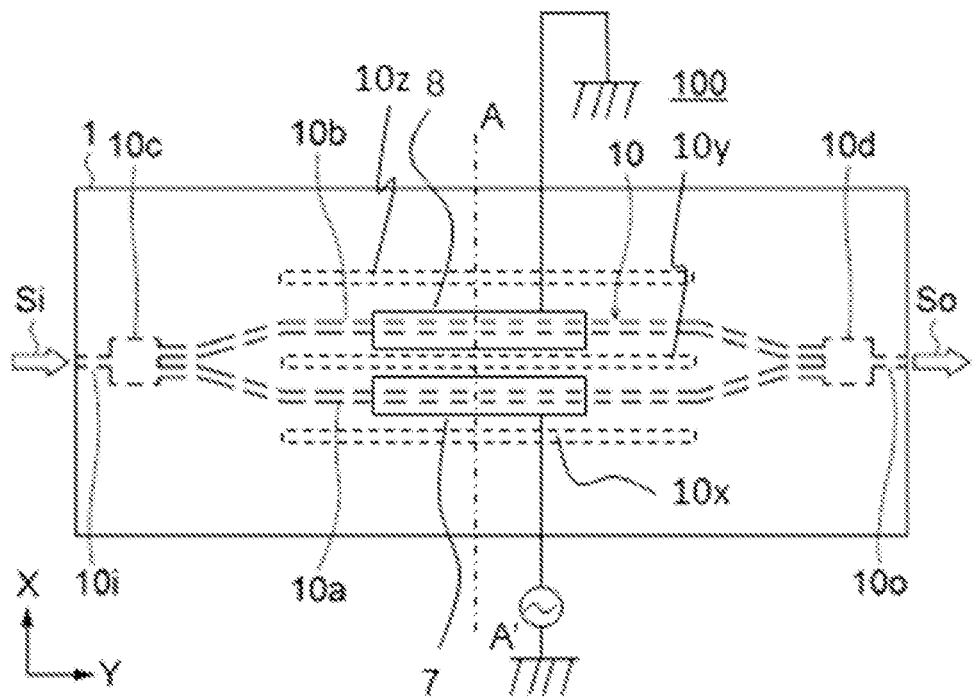

FIG. 1(a) and FIG. 1(b) are top views illustrating the optical modulator 100 with the optical device of the first embodiment of the present invention, in which FIG. 1(a) only illustrates the optical waveguide, and FIG. 1(b) illustrates the entire configuration of the optical modulator 100 including the optical device illustrated in FIG. 1(a) and traveling wave electrodes.

As illustrated in FIG. 1(a), the optical device included in the optical modulator 100 comprises: a Mach-Zehnder optical waveguide 10, provided with first and second optical waveguides 10a and 10b formed at the substrate 1 and arranged in parallel with each other, and as illustrated in FIG. 1(b), the optical modulator 100 further comprises: a first electrode 7 provided along the first optical waveguide 10a, and a second electrode 8 provided along the second optical waveguide 10b.

The Mach-Zehnder optical waveguide 10 is an optical waveguide having a structure of Mach-Zehnder interferometer. It is provided with the first and the second optical waveguides 10a and 10b branched from one input optical waveguide 10i at a demultiplexing section 10c, and the first and the second optical waveguides 10a and 10b are combined into one output optical waveguide 10o at a multiplexing section 10d. After the input light Si is demultiplexed at the demultiplexing section 10c and travels through the first and the second optical waveguides 10a and 10b, respectively, it is multiplexed at the multiplexing section 10d and output from the output optical waveguide 10o as modulated light So.

The first electrode 7 covers the first optical waveguide 10a in the top view, and the second electrode 8 covers the second optical waveguide 10b in the top view in the same way. In other words, the first electrode 7 is formed above the first optical waveguide 10a via the protective layer (to be described later), and the second electrode 8 is formed above the second optical waveguide 10b via the protective layer in the same way. The first electrode 7 is connected to, for example, an AC signal, and it can be referred to as a "signal electrode". The second electrode 8 is connected to, for example, the ground, and it can be referred to as a "ground electrode".

The electric signal (the modulation signal) is input to the first electrode 7. Since the first optical waveguide 10a is composed of materials with electro-optic effects such as lithium niobate etc., according to the electric field applied to the first optical waveguide 10a, the refractive index of the first optical waveguide 10a changes as +Δn and −Δn, and the phase difference between a pair of optical waveguides changes. The signal light modulated by the change of the phase difference is output from the output optical waveguide 10o.

In addition, in the region outside the region (the predetermined region) where the first and second optical waveguides 10a and 10b are provided, non-light-propagation optical waveguides 10x, 10y and 10z formed on the substrate 1 are provided. Herein, non-light-propagation optical waveguides 10x, 10y and 10z can be optical waveguides that do not propagate light in actual work. That is, there is no need to provide the electrode for applying the electric field on the non-light-propagation optical waveguides 10x, 10y and 10z. As illustrated in FIG. 1, when viewing the substrate 1 from above, the non-light-propagation optical waveguides 10x, 10y and 10z are provided in the vicinity of the straight line portion of the light-propagation Mach-Zehnder optical waveguide 10, for example, provided along the straight line portion of the first and second optical waveguides 10a and 10b, and a plurality of (three in this embodiment) non-light-propagation optical waveguides can be provided. When viewing the substrate 1 from above, the shape of the non-light-propagation optical waveguides 10x, 10y and 10z is a rectangular shape, but the shape of the non-light-propagation optical waveguides 10x, 10y and 10z is not limited to this, as long as it is a shape with the long side direction extending along the predetermined direction. For example, it can be an oblong, an oval etc. extending in the plane, and it can be also any other shape other than perfect circle and square. Also, the predetermine direction described above is preferred to extend along the extending direction of the first and second optical waveguides 10a and 10b, but not limited to the direction in parallel to the extending direction of the first and second optical waveguides 10a and 10b. Additionally, a side of the non-light-propagation optical waveguides 10x, 10y and 10z extends along the straight line of the optical waveguide, and more preferably, the shape of the non-light-propagation optical waveguides 10x, 10y and 10z is a rectangular shape, and a side on its long side extends along the straight line portion of the optical waveguide. Specifically, the non-light-propagation optical waveguide 10y is interposed between the first and second optical waveguides 10a and 10b. The non-light-propagation optical waveguides 10x and 10y are provided by interposing the first optical waveguide 10a between them. The non-light-propagation optical waveguides 10y and 10z are provided by interposing the second optical waveguide 10b between them. The non-light-propagation optical waveguides 10x, 10y and 10z can all extend along the extending direction of the first and second optical waveguides 10a and 10b.

Figure 2:
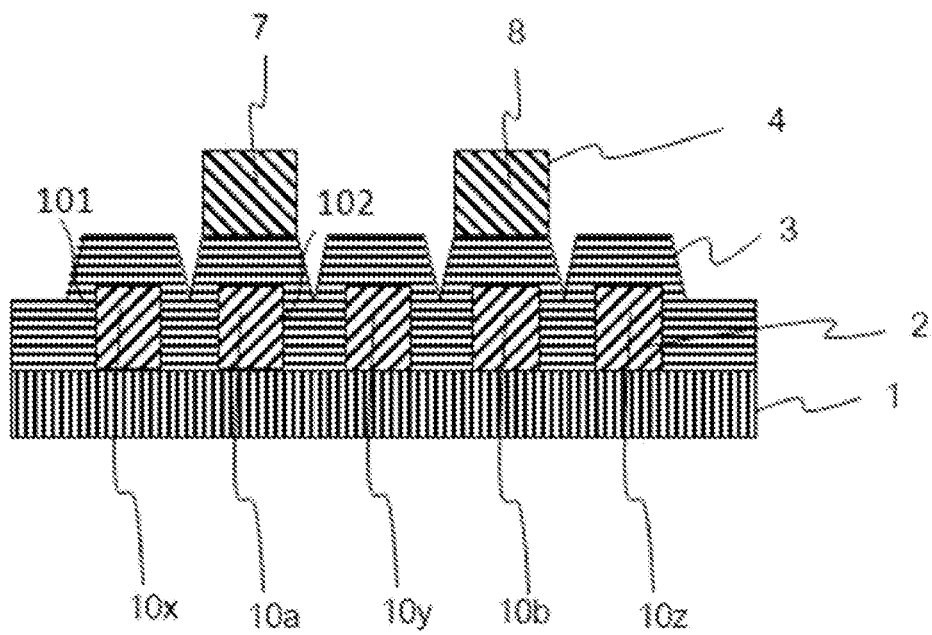
FIG. 2 is an illustrative cross-sectional view of the optical modulator 100 taken along line A-A' of FIG. 1(a) and FIG. 1(b).

FIG. 2 is an illustrative cross-sectional view of the optical modulator 100 taken along line A-A' of FIG. 1(a) and FIG. 1(b).

As illustrated in FIG. 2, the optical modulator 100 of the present embodiment is provided with at least a multilayer structure in which a substrate 1, an optical waveguide 2, a protective layer 3 and an electrode layer 4 are laminated in this order. The substrate 1 is, for example, a sapphire substrate, and the optical waveguide 2 formed of the lithium niobate film is formed at the surface of substrate 1. The Mach-Zehnder optical waveguide 10 comprise light-propagation first and second optical waveguides 10a and 10b. The width of the first and second optical waveguides 10a and 10b can be, for example, 1 µm.

To prevent the light propagating through the first and second optical waveguides 10a and 10b from being absorbed by the first electrode 7 or the second electrode 8, the protective layer 3 is formed adjacent to the optical waveguide 2, and it is at least formed at the first and second optical waveguide 10a and 10b of the Mach-Zehnder optical waveguide 10. Thus, the protective layer 3 only needs to function as an intermediate layer between the optical waveguide and the signal electrode, and the material of the protective layer 3 can be widely selected. For example, the protective layer 3 can be made of a non-metal oxide such as silicon oxide, a metal oxide such as alumina, a metal nitride, a metal carbide, a resin material such as polyimide, or an insulating material such as ceramics. The material of the protective layer 3 can be a crystalline material or an amorphous material. The protective layer 3 is preferably formed of a material with a lower refractive index than the optical waveguide 2, such as, $Al_2O_3$, $SiO_2$, $LaAlO_3$, $LaYO_3$, ZnO, $HfO_2$, MgO, $Y_2O_3$ etc. can be used. The thickness of the protective layer 3 formed at the optical waveguide is approximately 0.2~1.2 µm. In this embodiment, the protective layer 3 not only covers the upper surface of the first and second optical waveguides 10a and 10b, but also is filled between the first and second optical waveguides 10a and 10b. In other words, the protective layer 3 is also formed at the area that does not overlap with the first and second optical waveguides 10a and 10b in the top view. The protective layer 3 also covers the substrate 1 on which the optical waveguide 2 is not formed, and the side surfaces of the first and second optical waveguides 10a and 10b are also covered by the protective layer 3, so that the scattering loss due to the roughening of the side surfaces of the first and second optical waveguides 10a and 10b can be reduced as described later.

The electrode layer 4 is provided with the first electrode 7 and the second electrode 8. The first electrode 7 is opposite to the first optical waveguide 10a via the protective layer 3 so as to modulate the light traveling in the first optical waveguide 10a. The second electrode 8 is at least opposite to the second optical waveguide 10b via the protective layer 3 so as to modulate the light traveling in the second optical waveguide 10b.

As illustrated in FIG. 2, the non-light-propagation optical waveguide 10x, the first optical waveguide 10a, the non-light-propagation optical waveguide 10y, the second optical waveguide 10b, and the non-light-propagation optical waveguide 10z are arranged in order in the direction perpendicular to the direction of light propagation. The first electrode 7 and the second electrode 8 are provided above the first optical waveguide 10a and the second optical waveguide 10b via the protective layer 3. The protective layer 3 is provide above the non-light-propagation optical waveguide 10x, the non-light-propagation optical waveguide 10y and the non-light-propagation optical waveguide 10z, but electrode is not provided. This is because the non-light-propagation optical waveguides 10x, 10y and 10z only function as dummy optical waveguides in actual work, and they do not actually transmit optical signals. As illustrated in FIG. 2, the non-light-propagation optical waveguides 10x, 10y and 10z provided at the substrate 1 are surrounded by the protective layer 3, and the film thicknesses of the non-light-propagation optical waveguides 10x, 10y and 10z are substantially the same as that of the first and second optical waveguides 10a and 10b. Therefore, the structures of the non-light-propagation optical waveguides 10x, 10y, 10z and the protective layer 3 over them are approximately the same as the structures of the first and second optical waveguides 10a and 10b and the protective layer 3 over them. Thus, the stress applied to the optical waveguides 10a and 10b from the protective layer 3 can be reduced, the occurrence of cracks on the optical waveguides 10a and 10b can be suppressed, thereby improving the reliability and reducing the light propagation loss.

Since the optical waveguide 2 is not particularly limited as long as it is made of an electro-optic material, the film forming the optical waveguide 2 may be called an electro-optic material film. However, the optical waveguide 2 is preferably composed of lithium niobate ($LiNbO_3$). This is because lithium niobate has a large electro-optic constant and is suitable as a constituent material of optical devices such as optical modulators. The optical waveguide 2 may also be composed of lithium tantalate ($LiTaO_3$). In addition, when the optical waveguide 2 is composed of lithium niobate, other elements may also be doped, for example, lithium niobate may be doped with at least one selected from Ti, Mg, Zn, In, Sc, Er, Tm, Yb, and Lu. Hereinafter, the structure of the present embodiment when the optical waveguide 2 is a lithium niobate film will be described in detail.

The substrate 1 is not particularly limited as long as it has a lower refractive index than the lithium niobate film, but it is preferable a substrate on which a lithium niobate film can be formed as an epitaxial film, and a sapphire single crystal substrate or a silicon single crystal substrate is preferable. The crystal orientation of the single crystal substrate is not particularly limited. The lithium niobate film has properties such as being easily formed as a c-axis-oriented epitaxial film with respect to single crystal substrates of various crystal orientations. Since the c-axis oriented lithium niobate film has three-fold symmetry, it is desirable that the underlying single crystal substrate also has the same symmetry. In the case of a sapphire single crystal substrate, a c-plane substrate is preferred, and in the case of a silicon single crystal substrate, a (111) plane substrate is preferred.

Here, the epitaxial film is a film oriented in alignment with the crystal orientation of the underlying substrate or underlying film. When the film plane is defined as the XY plane and the film thickness direction is defined as the Z axis, the crystals are aligned and oriented along the X, Y and Z axes. For example, the epitaxial film can be verified by first confirming the intensity at the orientation position by 2θ-θ X-ray diffraction and secondly confirming the pole.

Specifically, first, when measurement is performed by 2θ-θ X-ray diffraction, the peak intensity of all peaks other than the target surface is 10% or less, preferably 5%, of the maximum peak intensity of the target surface. For example, in a c-axis oriented epitaxial film of lithium niobate, the peak intensity of planes other than the (00L) plane is 10% or less, preferably 5% or less of the maximum peak intensity of the (00L) plane. (00L) is a generic term for equivalent planes such as (001) and (002).

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The thickness of the lithium niobate film is preferably 2 μm or less, and it is preferably 1.2 μm. This is because if the film thickness is thicker than 2 μm, it is difficult to form a film with high quality. On the other hand, while the film thickness of the lithium niobate film is too thin, the restriction of light in the lithium niobate film becomes weaker and light may leak to the substrate 1 or the protective layer 3. Even if an electric field is applied to the lithium niobate film, there is a concern that the change in the effective refractive index of the first and second optical waveguides 10a and 10b becomes smaller. Therefore, the lithium niobate film preferably has a film thickness of about ⅒ or more of the wavelength of the used light or more.

It is desirable to form the lithium niobate film by a film forming method such as sputtering, CVD or sol-gel process. Application of an electric field along the c-axis perpendicular to the main surface of the single-crystal substrate 1 can change the optical refractive index in proportion to the electric field. In the case of the single-crystal substrate made of sapphire, the lithium niobate film can be directly epitaxially grown on the single-crystal sapphire substrate. In the case of the single-crystal substrate made of silicon, the lithium niobate film is epitaxially grown on a clad layer (not shown). The clad layer (not shown) has a lower refractive index than the lithium niobate film and should be suitable for epitaxial growth. For example, a high-quality lithium niobate film can be formed on a clad layer (not shown) made of $Y_2O_3$.

In addition, as a formation method for the lithium niobate film, a method of thinly polishing or slicing the lithium niobate single crystal substrate is known. This method has the advantage of obtaining the same characteristics as single crystals, and can be applied to the present invention.

The inventors of the present invention conducted the following experiment in order to verify the relationship between the provision of the non-light-propagation optical waveguide and the light-propagation loss. In which Sample 1 is an optical device with non-light-propagation optical waveguides. Sample 2 is an optical device with the same structure as Sample 1 except that the non-light-propagation optical waveguide is not provided.

TABLE 1

|  | Presence of micro-cracks at the optical waveguide | Light propagation loss |
| --- | --- | --- |
| Sample 1 | No | 12 dB |
| Sample 2 | Yes | non-light-guiding |

From Table 1, when the non-light-propagation optical waveguide is provided, there is no micro-crack on the optical waveguide, and the light propagation loss is low. When the non-light-propagation optical waveguide (the dummy optical waveguide) is not provided, micro-cracks are occurred at the optical waveguide, which leads the problem of "non-light-guiding". Therefore, the optical modulator 100 according to the first embodiment can reduce the stress applied to the optical waveguides 10a and 10b from the protective layer 3 and suppress the occurrence of micro-cracks at the light waveguides 10a and 10b, thereby improving reliability and reducing the light propagation loss.

Figure 3A:
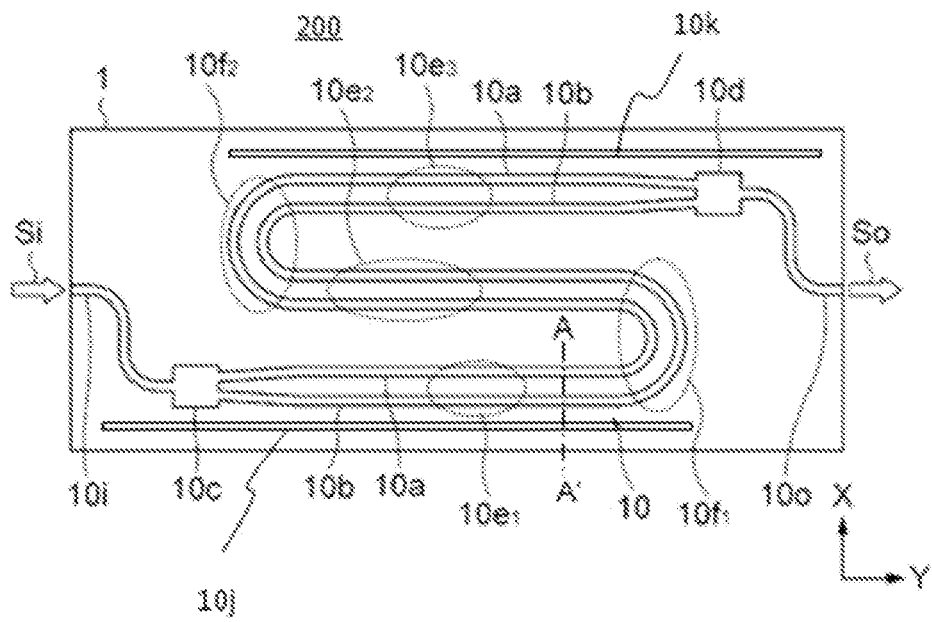
Figure 3B:
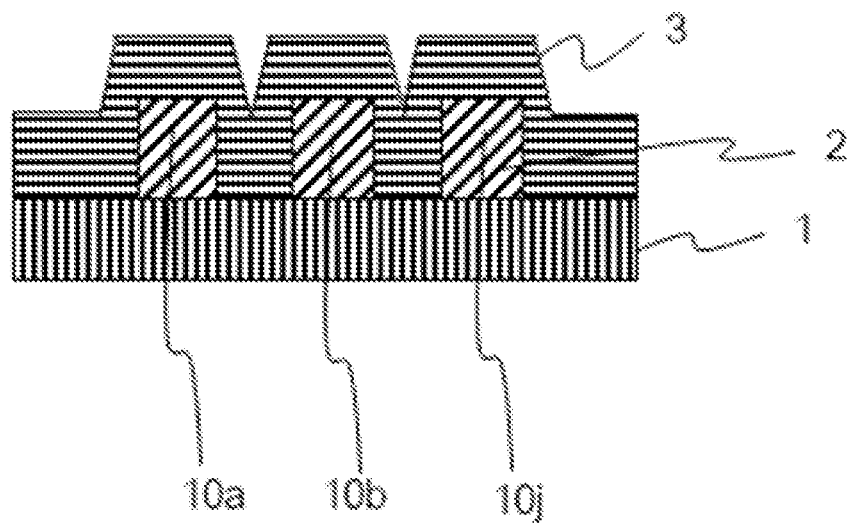

FIG. 3(a) and FIG. 3(b) are views illustrating the optical modulator 200 with the optical device of the second embodiment of the present invention, in which FIG. 3(a) is the top view only illustrating the optical waveguide of the optical modulator 200, and FIG. 3(b) is an illustrative cross-sectional view of the optical modulator 200 taken along line A-A' of FIG. 3(a).

As shown in FIG. 3(a), the optical modulator 200 of the second embodiment is characterized in that the Mach-Zehnder optical waveguide 10 is composed of a combination of straight line portions and curved portions. More specifically, the Mach-Zehnder optical waveguide 10 comprises: the first to the third straight line portions $10e_1$, $10e_2$ and $10e_3$ configured in parallel with each other; the first curved portion $10f_1$ connecting the first straight line portion $10e_1$ and the second straight line portion $10e_2$; and the second curved portion $10f_2$ connecting the second straight line portion $10e_2$ and the third straight line portion $10e_3$.

Thus, in the optical modulator 200 of this embodiment, the cross-sectional structure of the straight line portions $10e_1$, $10e_2$ and $10e_3$ of the Mach-Zehnder optical waveguide 10 along the line A-A' in FIG. 3(a) is constituted to become the cross-sectional structure shown in FIG. 2. That is, the first electrode 7 covers the first optical waveguide 10a in the first to third straight line portions $10e_1$, $10e_2$ and $10e_3$ via the protective layer 3, and in addition the second electrode 8 covers the second optical waveguide 10b in the first to third straight line portions $10e_1$, $10e_2$ and $10e_3$ via the protective layer 3. Preferably, the first electrode 7 and the second electrode 8 cover the entirety of the first to third straight line portions $10e_1$, $10e_2$, $10e_3$, but for example, it is also possible to only cover the first straight line portion $10e_1$.

In this embodiment, the input light Si is input to one end of the first straight line portion $10e_1$ and travels from one end of the first straight line portion $10e_1$ to the other end, and turns back at the first curved portion $10f_1$ and travels from one end of the second straight line portion $10e_2$ to the other end in a direction opposite to the direction of the first straight line portion $10e_1$, and turns back at the second curved portion $10f_2$ and travels from one end of the third straight line portion $10e_3$ to the other end in the same direction as the traveling direction in the first straight line portion $10e_1$.

In optical modulators, it is a big problem in actual work that the element length is too long. However, according to forming the optical waveguide by bending it back as shown in figures, the element length can be largely decreased and notable effects can be obtained. In particular, the optical waveguide formed of the lithium niobate film has the feature that the loss is still low even if the radius of curvature is reduced to, for example, about 50 μm, and is suitable for this embodiment.

In addition, in this embodiment, in the area outside that the first and second optical waveguides 10a and 10b are provided (the predetermined area), the non-light-propagation optical waveguides $10j$ and $10k$ formed on the substrate 1 are also provided. As shown in FIG. 3(a), when viewing the substrate 1 from above, the non-light-propagation optical waveguides $10j$ and $10k$ are provided in the vicinity of the straight line portions of the Mach-Zehnder optical waveguide 10, for example, provided along the straight line portions $10e_1$ and $10e_3$ of the first and second optical waveguides 10a and 10b, and a plurality of non-light-propagation optical waveguides can be provided (2 in this embodiment). When viewing the substrate 1 from above, the shape of the non-light-propagation optical waveguides $10j$ and $10k$ is a rectangular shape. One side of the non-light-propagation optical waveguides $10j$ and $10k$ with a rectangular shape extends along the straight line portion of the optical waveguide, and more preferably, one side on the long side of the rectangular shape extends along the straight line portion of the optical waveguide. Specifically, the non-light-propagation optical waveguide $10j$ is formed between the first straight line portion $10e_1$ and the end portion of the substrate 1. Preferably, the non-light-propagation optical waveguide $10j$ is formed along the first straight line portion $10e_1$. In addition, the non-light-propagation optical waveguide $10j$ shown in FIG. 3(a) is formed continuously, but it is not limited to this, and it can be also formed discontinuously. For example, the non-light-propagation optical waveguide $10j$ can be formed into island patterns, and each island pattern can be arranged in a straight line. Similarly, the non-light-propagation optical waveguide $10k$ is preferably formed between the third straight line portion $10e_3$ and the end portion of the substrate 1. Preferably, the non-light-propagation optical waveguide $10k$ is formed along the third straight line portion $10e_3$. In addition, the non-light-propagation optical waveguide $10k$ shown in FIG. 3(a) is formed continuously, but it is not limited to this, and it can also be formed discontinuously. For example, the non-light-propagation optical waveguide $10k$ can be formed into island patterns, and each island pattern can be arranged in a straight line. The cross-sectional structure of the non-light-propagation optical waveguides $10j$ and $10k$ can be the same as the structure of the non-light-propagation waveguides $10x$, $10y$ and $10z$ shown in FIG. 2. According to the optical modulator 200 of the second embodiment, the same effect as that of the optical modulator 100 of the first embodiment can be obtained, and it is possible to reduce the stress applied to the optical waveguides 10a and 10b (the first straight line portion $10e_1$ and the third straight line portion $10e_3$) from the protective layer 3, and suppress the occurrence of cracks on the optical waveguides 10a and 10b, thereby improving reliability and reducing the light propagation loss. In addition, since the end portion of the substrate is particularly easily influenced by external stress, by means of disposing the non-light-propagation waveguides $10j$ and $10k$ in the vicinity of the end portion of the substrate, the occurrence of cracks on the optical waveguides 10a and 10b can be further suppressed, thereby improving reliability and reducing the light propagation loss.

Figure 4A:
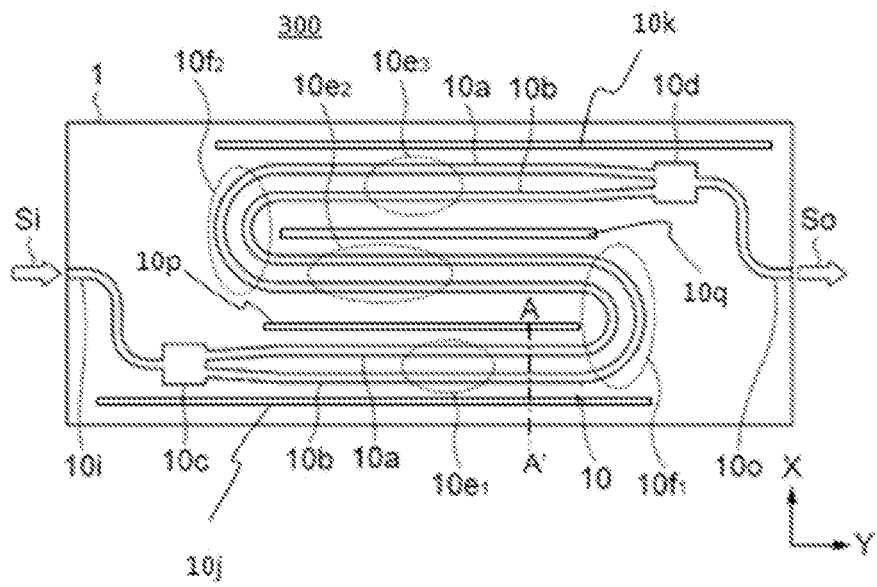
Figure 4B:
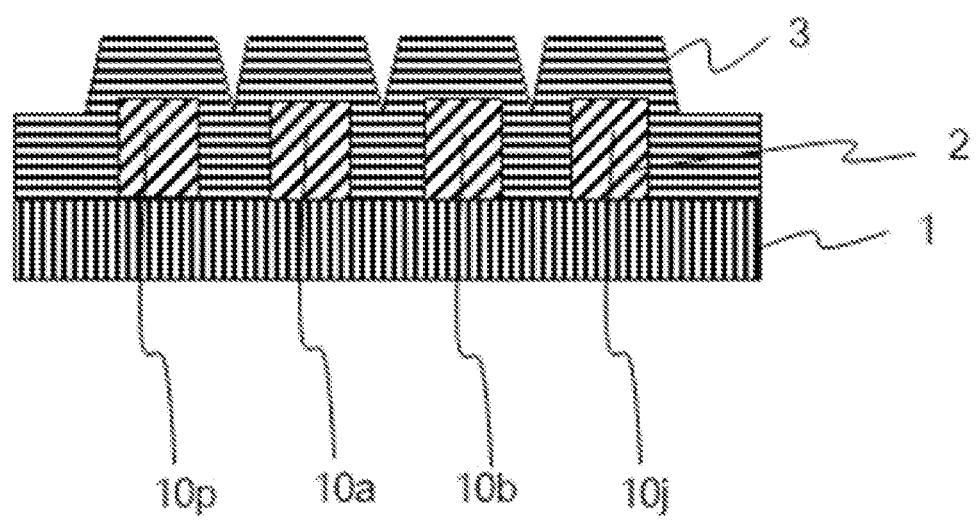

FIG. 4(a) and FIG. 4(b) are views illustrating the optical modulator 300 with the optical device of the third embodiment of the present invention, in which FIG. 4(a) is the top view only illustrating the optical waveguide of the optical modulator 300, and FIG. 4(b) is an illustrative cross-sectional view of the optical modulator 300 taken along line A-A' of FIG. 4(a). The difference between the optical modulator 300 of the third embodiment and the optical modulator 200 of the second embodiment is that the optical modulator 300 of the third embodiment also has a non-light-propagation optical waveguide $10p$ provided between the first straight line portion $10e_1$ and the second straight line portion $10e_2$, and an non-light-propagation optical waveguide $10q$ provided between the second straight line portion $10e_2$ and the third straight line portion $10e_3$. Specifically, the non-light-propagation optical waveguide $10j$ and the non-light-propagation optical waveguide $10p$ are configured opposite to each other with the first straight portion $10e_1$ interposed between them. The non-light-propagation optical waveguide $10p$ and the non-light-propagation optical waveguide $10q$ are configured opposite to each other with the second straight portion $10e_2$ interposed between them. The non-light-propagation optical waveguide $10q$ and the non-light-propagation optical waveguide $10k$ are configured opposite to each other with the third straight portion $10e_3$ interposed between them. As shown in FIG. 4(a), when viewing the substrate 1 from above, the non-light-propagation optical waveguides $10j$, $10p$, $10q$ and $10k$ are provided in the vicinity of the straight line portions of the Mach-Zehnder optical waveguide 10, for example, provided along the straight line portions $10e_1$, $10e_2$ and $10e_3$ of the first and second optical waveguides 10a and 10b, and a plurality of non-light-propagation optical waveguides can be provided (4 in this embodiment). When viewing the substrate 1 from above, the shape of the non-light-propagation optical waveguides $10j$, $10p$, $10q$ and $10k$ is a rectangular shape. One side of the non-light-propagation optical waveguides $10j$, $10p$, $10q$ and $10k$ with a rectangular shape extends along a straight line portion of the optical waveguide, and preferably, one side on the long side of the rectangular shape extends along the straight line portion of the optical waveguide. The cross-sectional structure of the non-light-propagation optical waveguides $10j$, $10p$, $10q$ and $10k$ can be the same as the structure of the non-light-propagation optical waveguides $10x$, $10y$ and $10z$ as shown in FIG. 2. The optical modulator 300 according to the third embodiment can also obtain the same effect as the optical modulator 100 of the first embodiment, and can reduce the stress applied to the optical waveguides 10a and 10b (the first to the third straight line portions $10e_1$, $10e_2$ and $10e_3$) from the protective layer 3, and suppress the occurrence of cracks at the optical waveguides 10a and 10b (the first to the third straight line portions $10e_1$, $10e_2$ and $10e_3$), thereby improving the reliability and reducing the light propagation loss.

In the above description, it is described that the first electrode is the signal electrode and the second electrode is the ground electrode. However, it is not limited to this, the first and second electrodes can be any electrode that applies an electric field to the optical waveguide. Furthermore, in the above description, the non-light-propagation optical waveguide is provided in the vicinity of the straight line portion of the optical waveguide, but it is not limited to this, the non-light-propagation optical waveguide is also provided at the curved portion or the bend portion of the optical waveguide. In addition, in the above description, one side on the long side of the rectangular shape of the non-light-propagation optical waveguide is provided along the straight line portion of the optical waveguide, but not limited to this, the non-light-propagation optical waveguide can be also other shapes.

Next, the method of forming the side surfaces of the non-light-propagation optical waveguide into rough surfaces is described. Hereinafter, forming the side surfaces of the non-light-propagation optical waveguide $10x$, $10y$ and $10z$ in the optical modulator 100 of the first embodiment into rough surfaces is described as an example.

As illustrated in FIG. 2, the non-light-propagation optical waveguide $10x$, $10y$ and $10z$ and the light-propagation first and second optical waveguides 10a and 10b respectively have two side surfaces 101 and 102 that are substantially perpendicular to the substrate 1. At least one of the side surfaces 101 and 102 is formed into a rough surface. In other words, the rough surfaces can be formed on both side surfaces 101 and 102 at the same time, and the rough surface can be also only formed on any one of the side surfaces 101 and 102. The rough surface is formed to reduce the influence of stress caused by the difference in expansion coefficient between the lithium niobate film constituting the optical waveguide 2 and silicon oxide, thereby reducing the light propagation loss.

The degree of roughening can be indicated by the surface roughness RMS (root mean square), and in the optical modulator 100 of this embodiment, the surface roughness of the side surfaces 101 and 102 of the non-light-propagation optical waveguides $10x$, $10y$ and $10z$ is RMS 0.5 nm or more, and more preferably, is RMS 1.0 nm or more. As a result, the optical modulator 100 according to this embodiment, by providing the non-light-propagation optical waveguides $10x$, $10y$ and $10z$, the stress applied to the optical waveguide 2 from the protective layer can be reduced and the occurrence of micro-cracks on the optical waveguide 2 can be suppressed, thereby reducing the light propagation loss. In addition, by roughening at least one of the side surfaces 101 and 102 of the non-light-propagation optical waveguides $10x$, $10y$ and $10z$, the influence of stress caused by the difference in expansion coefficient between the lithium niobate and silicon oxide can be reduced and the occurrence of micro-cracks on the optical waveguide 2 can be suppressed, thereby reducing the light propagation loss.

The degree of roughening can be defined by the maximum value Rmax of the roughness of the rough surface. The maximum value Rmax of roughness refers to the distance between the highest point (peak) and the lowest point (valley) of the surface contour within the specified length. The maximum value Rmax of the roughness of the rough surface is measured, for example, using AFM (Atomic Force Microscope). In the rough surface above, there are 2 peaks or more and 10 peaks or less in the field of view of 1.5 µm×0.2 µm. Specifically, in the optical modulator 100 of this embodiment, by setting the maximum value Rmax of the roughness of the rough surface to be 8.6 to 55 nm, the light propagation loss can be suppressed to be low, and by setting the maximum value Rmax of the roughness of the rough surface to be 17 to 40 nm, the light propagation loss can be further suppressed to be lower. Thus, by forming the predetermined rough surface on the surface described above, the light propagation loss caused by the influence of stress on the optical waveguide due to difference of expansion coefficient between the lithium niobate film and silicon oxide is suppressed.

The pattern shape of the above-mentioned rough surface is not particularly limited, as long as it is a rough surface whose surface is uneven. For example, a plurality of protrusions may be formed, a plurality of dot-shaped depressions may be randomly formed, or other patterns may also be formed on the surfaces of the side surfaces 101 and 102 of the non-light-propagation optical waveguides $10x$, $10y$ and $10z$. In this embodiment, the rough surfaces of the side surfaces 101 and 102 can be formed to have stripes. Herein, the "stripes" refers to uneven patterns in which a plurality of concave and convex portions is alternatively arranged. The pattern of stripes is preferably formed in an elongated shape in which the longitudinal direction of stripes intersects with the substrate, which is also referred to as a longitudinal stripe shape.

In each of the above roughening patterns, comparing with a horizontal stripe shape or random roughness pattern, the longitudinal stripe shape is the best pattern representation with a specific roughness in such a way that the frequency of the peaks collectively appears in a predetermined field of view. It is because that, for a lithium niobate film with an optical waveguide of 2.0 µm or less, the longitudinal stripes can ensure that there are 2 peaks or more and 10 peaks or less in the field of view of 1.5 µm×0.2 µm, and the number of the peaks appears continuously or repeatedly at predetermined intervals. However, the horizontal stripes or random roughness can only have about 0 to 1 peak in a predetermined field of view. Therefore, in order to obtain the roughness with a constant frequency of appearance of the peaks, the roughening pattern is most preferably in the shape of longitudinal stripes. By forming the rough surface with a longitudinal stripe shape on the side surfaces 101 and 102 of the non-light-propagation optical waveguides $10x$, $10y$ and $10z$, the light propagation loss caused by the influence of stress on the optical waveguide due to difference of expansion coefficient between the lithium niobate film and silicon oxide is suppressed.

The method of forming the rough surface is not particularly limited, and a known method can be used. Hereinafter, a method of forming rough surfaces on both side surfaces 101 and 102 of the non-light-propagation optical waveguides $10x$, $10y$ and $10z$ by milling and resist patterning is described as an example.

The method of forming a rough surface by milling and resist patterning includes: a step of roughening the surface; a step of forming a resist layer on the surface; and a step of exposing the surface through a mask to remove the resist layer.

In addition, the method of forming the rough surface on the side surface of the lithium niobate film, that is the optical waveguide 2, is not limited to the above method, and the rough surface can be formed by, for example, laser etching, metal mask patterning, and RIE etching. Specifically, in the method of forming the rough surface using a laser, the surfaces of the two side surfaces 101 and 102 of the lithium niobate film, which is the optical waveguide 2, are irradiated with a laser beam and scanned back and forth, and the scanning direction is the same as the direction of the light propagation. The scanning direction runs along the side surface of the optical waveguide 2 so that elongated longitudinal stripes are formed in the direction crossing the substrate. Metal mask patterning and RIE etching are methods in which a metal mask pattern is formed on the surfaces of the two side surfaces 101 and 102 of the lithium niobate film, which is the optical waveguide 2, and RIE etching is performed. RIE (Reactive Ion Etching) is a kind of dry etching. The principle of RIE etching is that when a high frequency voltage (RF: radio frequency) of 10 to 100 MHZ is applied between the plate electrodes, an ion sheath with a thickness of hundreds of microns, in which the sample is placed, is generated and the ions hit the sample at high speed to complete the chemical reaction etching.

In addition, the same method as that used to form the side surfaces 101 and 102 of the non-light-propagation optical waveguides 10x, 10y and 10z into the rough surfaces can also be used for forming the side surfaces 101 and 102 of the light-propagation first and second optical waveguides 10a and 10b of the Mach-Zehnder optical waveguides 10 into the rough surfaces, and the roughness of the side surfaces of the first and second optical waveguides 10a and 10b can be the same as the side surfaces 101 and 102 of the non-light-propagation optical waveguides 10x, 10y and 10z. In addition, the same method as that used to form the side surfaces 101 and 102 of the non-light-propagation optical waveguides 10x, 10y and 10z into the rough surfaces can also be used for forming each upper surface of the optical waveguide 2 into a rough surface, while the roughness of each upper surface of the optical waveguide 2 is preferably lower than the RMS of the side surfaces, that is, the upper surfaces are comparatively flatter comparing with the side surfaces. When both the upper surfaces and the side surfaces of the optical waveguides are formed into rough surfaces, the light propagation loss can be further reduced. In addition, it is not limited to this method, and any method can be utilized, as long as it is possible to form a rough surface on at least one side surface of the lithium niobate film.

Similarly, in the optical modulator 200 of the second embodiment, at least one side surface of the non-light-propagation optical waveguides 10j and 10k can be further formed into a rough surface. Thus, according to the optical modulator 200 of the second embodiment, by providing the non-light-propagation optical waveguides 10j and 10k, it is possible to reduce the stress applied to the optical waveguide 2 from the protective layer and suppress the occurrence of micro-cracks on the optical waveguide 2, thereby reducing the light propagation loss. In addition, by roughening at least one of the side surfaces 101 and 102 of the non-light-propagation optical waveguides 10j and 10k, it is possible to reduce the influence of stress caused by the difference in expansion coefficients of lithium niobate and silicon oxide, and the occurrence of micro-cracks on the optical waveguide 2 is further suppressed, thereby reducing the light propagation loss. Similarly, in the optical modulator 300 of the third embodiment, at least one side surface of the non-light-propagation optical waveguides 10p, 10j, 10k and 10q can be formed into a rough surface. Thus, according to the optical modulator 300 of the third embodiment, by providing the non-light-propagation optical waveguides 10p, 10j, 10k and 10q, it is possible to reduce the stress applied to the optical waveguide 2 from the protective layer and suppress the occurrence of micro-cracks on the optical waveguide 2, thereby reducing the light propagation loss. In addition, by roughening at least one of the side surfaces 101 and 102 of the non-light-propagation optical waveguides 10p, 10j, 10k and 10q, it is possible to reduce the influence of the stress caused by the difference in expansion coefficients of lithium niobate and silicon oxide, and the occurrence of micro-cracks on the optical waveguide 2 can be further suppressed, thereby reducing the light propagation loss.

EXAMPLE

For the optical modulator 100 with the cross-sectional structure of the optical waveguide 2 shown in FIG. 2, the surface roughness of the side surfaces 101 and 102 of the non-light-propagation optical waveguides 10x, 10y and 10z is changed, and the light propagation loss in the case of rough surfaces with different roughness RMS are compared. As examples and comparative examples, only the roughness RMS is changed, and any other structure is the same. The evaluation results of each example and comparative example are shown in Table 2.

TABLE 2

|  | Roughness RMS (nm) | Light propagation loss (dB) |
| --- | --- | --- |
| Example 1 | 0.5 | 12 |
| Example 2 | 1.0 | 8 |
| Example 3 | 3.0 | 9 |
| Example 4 | 4.0 | 9 |
| Comparative example 1 | 0.4 | 20 |
| Comparative example 2 | 0.3 | Non-light-guiding |

From Table 2, while the roughness RMS is 0.5 nm or more, the light propagation loss can be suppressed to be low; while the roughness RMS is 1.0 nm or more, the light propagation loss can be further suppressed to be lower.

Although the present invention has been specifically described above with reference to the accompanying drawings and examples, it can be understood that the above description does not limit the present invention in any form. For example, in the above description of the optical modulator 100, it is described that the first electrode is the signal electrode and the second electrode is the ground electrode. However, it is not limited to this, the first and second electrodes can be any electrode that applies an electric field to the optical waveguide. For example, the first electrode can be a signal electrode, and the second electrode can be a ground electrode. Since the optical modulator is so-called single-driving type provided with one signal electrode, and the signal electrode as the first electrode and the ground electrode as the second electrode have symmetrical structures, so the electric fields applied to the first and second optical waveguides are equal in magnitude and opposite in sign. In addition, the embodiments of the present invention can be also suitable for various devices without electrodes. In addition, for example, in the above description of the light modulator 100, both the side surfaces 101 and 102 of the first optical waveguide 10a have rough surfaces, but it is not limited to this, and it can be also that only one surface of the side surface 101 or the side surface 102 has a rough surface.

In addition, in the above embodiment, the optical waveguide 2 is formed as a raised ridge at the surface of the substrate 1, but the formation of the optical waveguide 2 is not limited to this, it is also possible to implant ions into the substrate to form an optical waveguide, for example, doping Ti in a lithium niobate single crystal substrate to form an optical waveguide 2, and these modifications are also included in this embodiment.

In addition, in the above embodiments, an example that an optical modulator containing electrodes is given, but of course, the present invention can also be applied to an optical device provided only with optical waveguides but without electrodes, and the present invention can be also applied to arbitrary optical device which can achieve optical communication or optical measurement such as an optical switch, an optical resonator, an optical branch circuit, a sensor element, a millimeter wave generator etc. Those skilled in the art can make modifications and changes to the present invention as required without departing from the essential spirit and the scope of the present invention, and these modifications and changes all fall within the scope of the present invention.

REFERENCE NUMERAL 1 substrate
2 optical waveguide
3 protective layer
4 electrode layer
7 first electrode
8 second electrode
10 Mach-Zehnder optical waveguide
10$a$ first optical waveguide
10$b$ second optical waveguide
10$c$ demultiplexing portion
10$d$ multiplexing portion
10$i$ input optical waveguide
10$o$ output optical waveguide
10$e_1$ first straight line portion of the Mach-Zehnder optical waveguide
10$e_2$ second straight line portion of the Mach-Zehnder optical waveguide
10$e_3$ third straight line portion of the Mach-Zehnder optical waveguide
10$f_1$ first curved portion of the Mach-Zehnder optical waveguide
10$f_2$ second curved portion of the Mach-Zehnder optical waveguide
10$x$, 10$y$, 10$z$, 10$j$, 10$p$, 10$q$, 10$k$ non-light-propagation optical waveguide
101 one side surface
102 the other side surface

The invention claimed is:
1. An optical device comprising:
a substrate;
an optical waveguide provided in a predetermined region of the substrate and formed of an electro-optic material film;
a protective layer formed adjacent to the optical waveguide; and
a non-light-propagation optical waveguide provided outside the predetermined region, wherein,
a surface roughness of the non-light-propagation optical waveguide is RMS 0.5 nm or more, and
the non-light-propagation optical waveguide is a waveguide that is not configured to transmit an optical signal,
wherein a surface roughness on a side of the non-light-propagation optical waveguide is formed in a striped pattern,
wherein the side of the non-light-propagation optical waveguide is a side facing the optical waveguide and is transverse to the substrate, and
wherein a plurality of stripes forming the striped pattern are formed in an elongated shape extending in a direction which intersects the substrate.
2. The optical device according to claim 1, wherein
when viewing the substrate facing a stacking direction of the protective layer, the optical waveguide, and the substrate in said order, a long side of the non-light-propagation optical waveguide which is longer than at least one other side of the non-light-propagation optical waveguide extends along a predetermined direction.
3. The optical device according to claim 2, wherein
the optical waveguide comprises a straight line portion,
when viewing the substrate facing a stacking direction of the protective layer, the optical waveguide, and the substrate in said order, one side of the non-light-propagation optical waveguide extends along the straight line portion of the optical waveguide.
4. The optical device according to claim 2, wherein
when viewing the substrate facing a stacking direction of the protective layer, the optical waveguide, and the substrate in said order, a shape of the non-light-propagation optical waveguide is a rectangular shape, and the long side extends along a straight line portion of the optical waveguide.
5. The optical device according to claim 1, wherein
the non-light-propagation optical waveguide is provided in the vicinity of a straight line portion of the optical waveguide.
6. The optical device according to claim 1, wherein
the surface roughness of the non-light-propagation optical waveguide is RMS 1.0 nm or more.
7. The optical device according to claim 1, wherein
a plurality of non-light-propagation optical waveguides are provided.
8. The optical device according to claim 1, wherein
a film thickness of the non-light-propagation optical waveguide and a film thickness of the optical waveguide are substantially the same.
9. The optical device according to claim 1, wherein
the electro-optic material film is a film formed of $LiNbO_3$.
10. The optical device according to claim 1, wherein
the electro-optic material film is a film formed of $LiNbO_3$ doped with at least Ti.
11. The optical device according to claim 1, wherein
the electro-optic material film is an epitaxial film.
12. The optical device according to claim 11, wherein
axes of a crystal lattice in the epitaxial film are orientated in a direction crossing the substrate.
13. The optical device according to claim 1, wherein a thickness of the optical waveguide and the non-light-propagation optical waveguide is smaller than 2 μm.
14. An optical modulator comprising:
a substrate;
an optical waveguide provided in a predetermined region of the substrate and formed of an electro-optic material film;
a protective layer formed adjacent to the optical waveguide;
an electrode configured to apply an electric field to the optical waveguide; and
a non-light-propagation optical waveguide provided outside the predetermined region, wherein,
a surface roughness of the non-light-propagation optical waveguide is RMS 0.5 nm or more,
the non-light-propagation optical waveguide is a waveguide that is not configured to transmit an optical signal, wherein a surface roughness on a side of the non-light-propagation optical waveguide is formed in a striped pattern, wherein the side of the non-light-propagation optical waveguide is a side facing the optical waveguide and is transverse to the substrate, and wherein a plurality of stripes forming the striped pattern are formed in an elongated shape extending in a direction which intersects the substrate.

* * * * *